United States Patent [19]

Arai

[11] Patent Number: 5,047,148

[45] Date of Patent: Sep. 10, 1991

[54] RETAINED WIRE FILTER ELEMENT

[76] Inventor: Koichi Arai, c/o Arai Corp., 1390-1, Kurami Samukawa, Koza, Kanagawa, Japan

[21] Appl. No.: 513,638

[22] Filed: Apr. 24, 1990

[51] Int. Cl.$^5$ .............................................. B01D 29/05
[52] U.S. Cl. ................................... 210/498; 210/499; 29/163.8; 29/902; 29/DIG. 77
[58] Field of Search ............... 210/498, 499; 29/163.8, 29/902, DIG. 77

[56] References Cited

U.S. PATENT DOCUMENTS

| | | | |
|---|---|---|---|
| 2,205,758 | 6/1940 | Clark | 210/499 |
| 2,271,662 | 2/1942 | Rubisson | 210/499 |
| 2,288,883 | 7/1942 | Bixby | 210/499 |
| 3,716,144 | 2/1973 | Bartlon | 210/499 |
| 3,941,703 | 3/1976 | Binard | 29/163.8 |
| 4,843,700 | 7/1989 | Arai | 29/163.8 |
| 4,846,971 | 7/1989 | Lamont | 29/163.8 |

Primary Examiner—W. Gary Jones
Assistant Examiner—Wanda L. Millard

[57] ABSTRACT

A filter element for filter systems, which comprises a plurality of plate members having a number of apertures therethrough and cutout grooves formed in the surface thereof, a plurality of wire members each having a retaining leg portion, which is inserted into one of the grooves of the plate member, whereby the top surfaces of the wire members are flashed in a definite plane for forming a plurality of slits for filtering a liquid.

15 Claims, 2 Drawing Sheets

RETAINED WIRE FILTER ELEMENT

BACKGROUND OF THE INVENTION

(1) Field of the Invention

The present invention relates to a novel filter element, and more particularly to a filter element, in which a plurality of filter slits with minute width can be formed with a higher accuracy by means of an improved securing arrangement.

(2) Description of the Prior Art

In a conventional filter element of this type, a plurality of linearly disposed filter slits were formed in such a manner that each wire rod was welded one by one so as to be fixed together, or by shaping in the lower surface of a plate member.

As mentioned above, filter slits have been formed by a complicated process such as welding or cutting of wire rod material, resulting in filter slits with a poor accuracy and degraded uniformity.

SUMMARY OF THE INVENTION

In view of the aforementioned disadvantages, an object of the present invention is to provide a filter element, in which a wire rod material is simply secured to a plate member with a plurality of openings by means of a suitable retaining arrangement.

More particularly, the present invention is to provide a filter element comprising a plurality of filter wire members each having a definite section, a plurality of plate members each having a plurality of apertures formed in the surface of plate members, said wire members being disposed along a plurality of grooves formed in the surface of said plate members, and a plurality of filtering apertures formed in straight lines between each pair of adjacent wire members.

In use of a filter apparatus, one or plurality of filter elements of the present invention are arranged within the flowing way of a liquid to be filtered. The filter elements can be used either in closed condition, in which elements are installed transversely to the flow direction of the liquid, or in open condition, in which the elements are arranged in parallel to the flowing direction.

In use in open condition, the filtered liquid can be passed to the secondary side, and the residue can be collected at the primary side to be removed.

By arrangement of two or more filter elements, filtering ability can be stepwise varied, thereby filter operation being performed stepwise and efficiently.

BRIEF DESCRIPTION OF THE ACCOMPANYING DRAWINGS

DETAILED DESCRIPTION OF PREFERRED EMBODIMENTS

Figure 1:
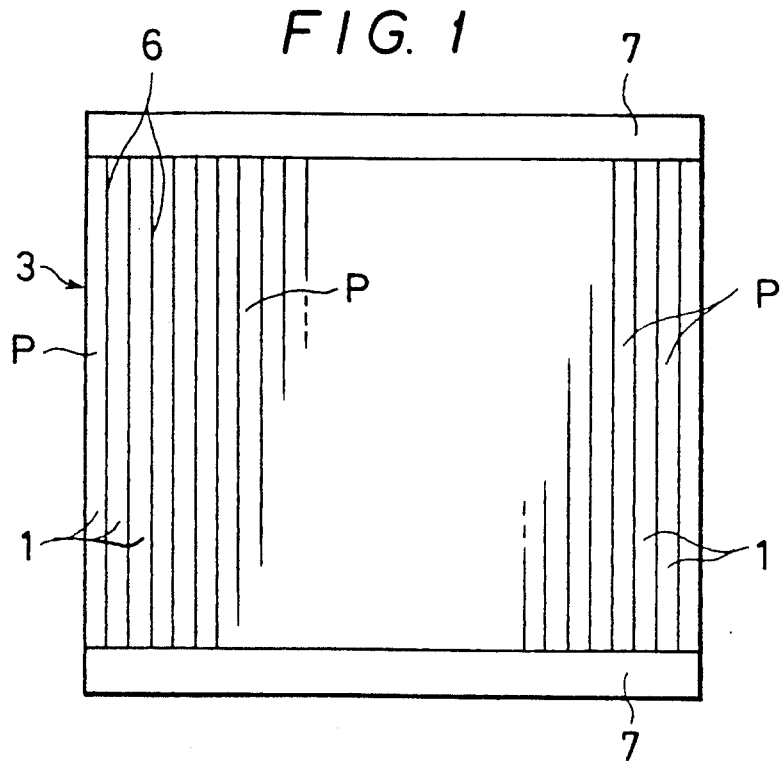
FIG. 1 is a plan view of a filter element according to the present invention.
Figure 2:
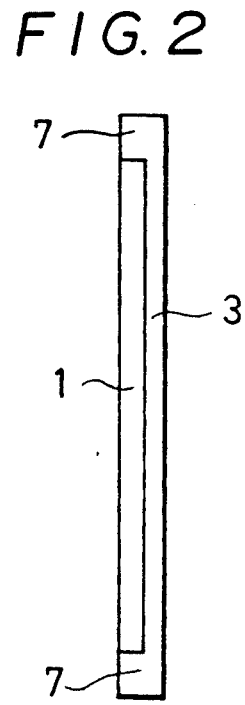
FIG. 2 is a side view of the filter element shown in FIG. 1.
Figure 3:
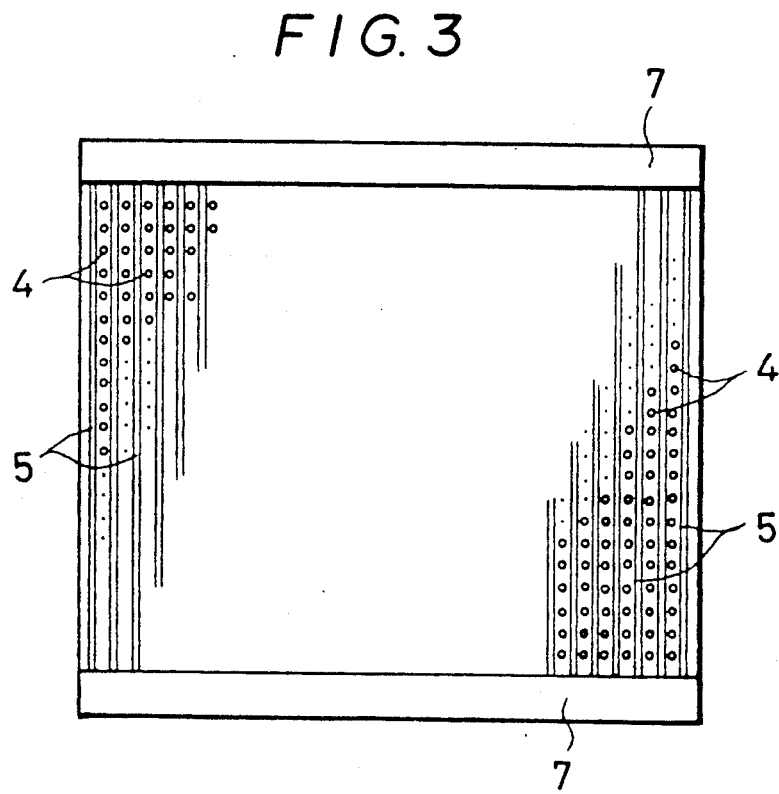
FIG. 3 is a plan view of a plate member alone.
Figure 4:
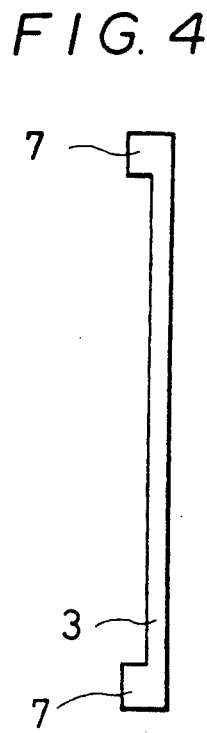
FIG. 4 is a side view of the plate member shown in FIG. 3.

The preferred embodiments of the invention will now be described with reference to the accompanying drawings.

The numeral 1 represents a filter wire member formed as a longitudinal bar with a triangular cross section, having a flat top surface P and a retaining portion 2 formed as an longitudinal bar along the apex line of the triangle. A plate member 3 is formed like a printing plate, provided with a plurality of filtering apertures 4 and cutout grooves 5 for receiving the retaining portions 2. A plurality of filtering slits 6 between wire members 1 are formed with an accuracy of 1 $\mu$m to 1 mm.

Accordingly, the top surface P of wire member 1 is formed to have a width not exceeding that between the grooves 5 disposed adjacent each other.

As can be easily understood, precision finishing is necessary for surfaces between retaining legs 2 and grooves 5, in order to maintain all of top surfaces P in a definite plane for forming the filtering slits with a higher accuracy.

Figure 5:
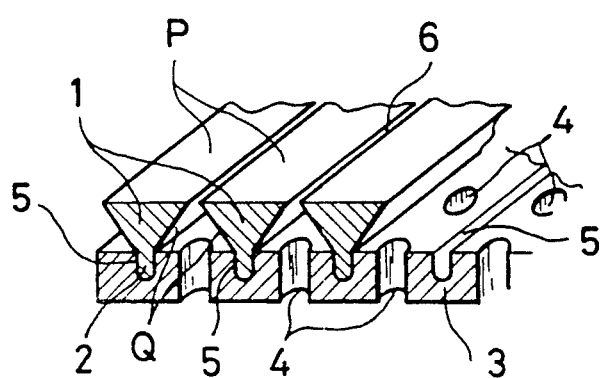
FIG. 5 is a partial perspective view showing filter wire members retained to a plate member.

In a preferred arrangement, the apertures 4 are formed remote from grooves 5 as shown in FIG. 5, and plate member 3 is provided with a pair of rims 7, 7 raised from the opposite edges so as to be flashed with the top surfaces of wire members 1.

In such an arrangement, plate member 3 is placed in parallel to the flow of a liquid to be filtered, the residue is left on the wire members 1, and the filtered liquid, which is passed through the filter slits 6, can be collected out of the secondary side. Also, by arranging a plurality of filter elements of different sizes with filter slits of different gap sizes, the liquid can be steppingly filtered and processed according to the streams of various forms.

Not only the secondary side but also the residue removing side are formed so as to be suitable for use in open condition, which is suitable enough for any filter systems of this type.

Figure 8:
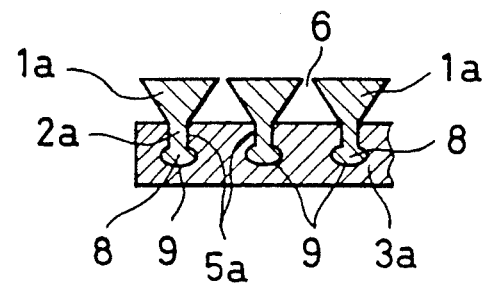
FIG. 8 is an enlarged partial sectional view of FIG. 7.
Figure 6:
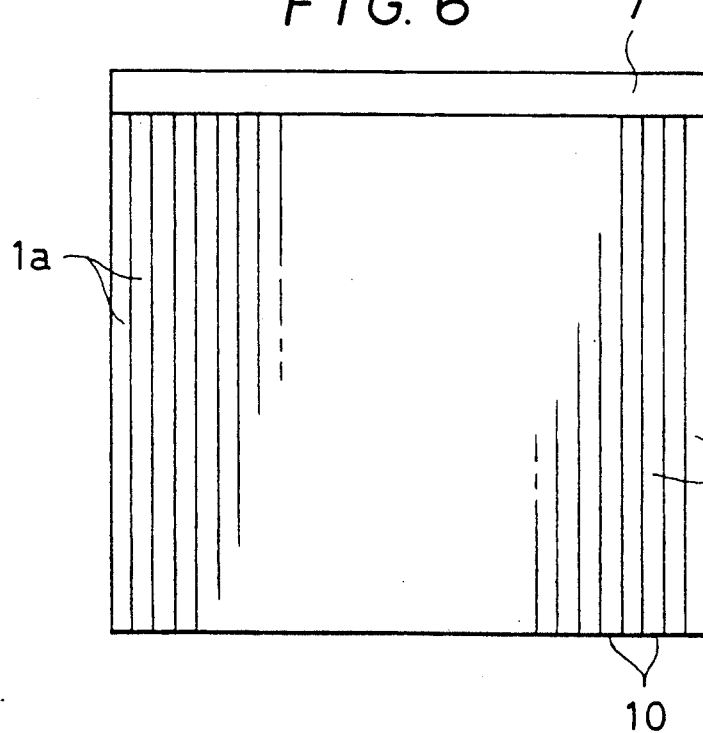
FIG. 6 is a plan view of another embodiment according to the invention.
Figure 7:
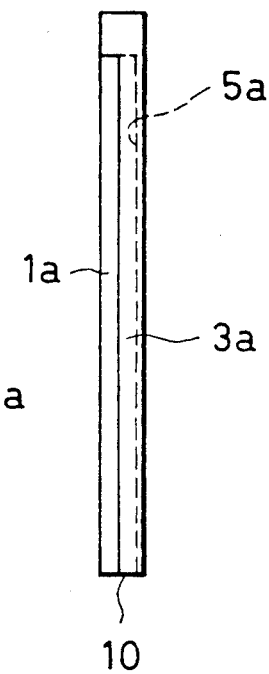
FIG. 7 is a side view of FIG. 6.

FIGS. 6 through 8 represent another embodiment of the invention, which is different from the aforementioned embodiment in that the retaining leg 2a of each filter member 1a, provided with an enlarged portion 8, is received in a groove 5a, which is also provided with a broadened portion 9 at the end thereof.

An advantage of this arrangement is that each filter member 1a can be attached to the plate member 3a by sliding action from the free end 10 of plate member 3a, because the enlarged portion 8 can be held during such sliding action.

Figure 9A:
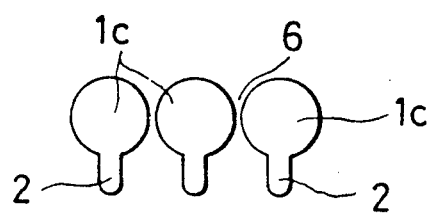
FIG. 9 (a) is an enlarged sectional view of another form, and (b) is still further form of a wire member, respectively.
Figure 9B:
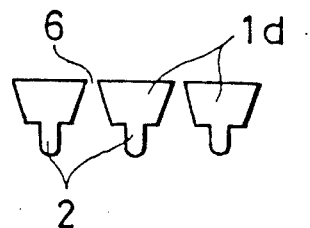

FIG. 9 represents two modified forms of wire members. FIG. 9 (a) is a set of wire members 1c each having a circular section, arranged so as to leave filter slits 6 therebetween. Also, FIG. 9 (b) illustrates wire members 1d each having an inverted-trapezoidal section, leaving filter slits 6 therebetween.

According to the invention, the plate member and wire member can be separately produced. The wire member is provided with a retaining leg, which is accurately retained in a groove of the plate member. As a result, the filter slits can be formed with an extremely higher accuracy. Further, the filter elements, which are simply assembled, can cope with cost requirements and mass production.

Further, according to the invention, a large number of filter wire members of a predetermined dimension can be produced with great efficiency through cutting process from a long size wire material having a definite cross section.

What is claimed is:

1. A filter element including, in combination:
   a) a plurality of filter wire members each having a definite cross-section and a retaining portion;
   b) a plate member having a plurality of apertures formed therein, and having a plurality of longitudinal grooves formed in the top surface thereof; and
   c) a plurality of longitudinal filtering slits formed by said plurality of filter wire members being retained in said longitudinal grooves by said retaining portions thereof.

2. The device defined in claim 1, wherein said apertures in said plate member are provided between said grooves.

3. The device defined in claim 2, wherein the top surface of said filter wire members form a smooth filtering surface.

4. The device defined in claim 1, and further including a rim at each lateral extremity of said plate member, the height of said rims being equal to the height of said filter wire members.

5. The device defined in claim 1, wherein said definite cross-section is circular.

6. The device defined in claim 1, wherein said definite cross-section is triangular.

7. The device defined in claim 1, wherein said definite cross-section is trapezoidal.

8. A filter element including, in combination:
   a) a plate member having a plurality of apertures formed therein and having a plurality of longitudinal grooves formed in the top surface thereof, said longitudinal grooves having a broadened portion provided at the bottom thereof;
   b) a plurality of filter wire members each having a definite cross-section, each of said wire members having a retaining legs formed thereon, each of said retaining legs having provided with an enlarged portion complimentary in shape to said broadened portion of said longitudinal grooves;
   c) a plurality of longitudinal filtering slits formed by said plurality of filter wire members being retained in said longitudinal grooves by said retaining legs of said filter wire members.

9. The device defined in claim 8, wherein said apertures are provided between said grooves.

10. The device defined in claim 9, wherein the top surfaces of said filter wire members provide a smooth surface.

11. The device defined in claim 9, wherein said definite cross-section is triangular.

12. The device defined in claim 9, wherein said definite cross-section is circular.

13. The device defined in claim 9, wherein the shape of said definite filter wire member is that of an inverted trapezoid.

14. The device defined in claim 8, wherein said plate member is provided with a rim at one lateral extremity thereof.

15. The device defined in claim 14, wherein the height of said rim is equal to the height of said filter wire members.

* * * * *